(12) United States Patent
Bowen

(10) Patent No.: US 7,209,127 B2
(45) Date of Patent: Apr. 24, 2007

(54) ELECTRONIC SKETCH PAD AND AUXILIARY MONITOR

(76) Inventor: James H. Bowen, 110 Corporate Dr., Elizabeth City, NC (US) 27909

( * ) Notice: Subject to any disclaimer, the term of this patent is extended or adjusted under 35 U.S.C. 154(b) by 610 days.

(21) Appl. No.: 10/802,732

(22) Filed: Mar. 18, 2004

(65) Prior Publication Data
US 2004/0183747 A1   Sep. 23, 2004

Related U.S. Application Data

(63) Continuation-in-part of application No. 09/427,752, filed on Oct. 27, 1999, now abandoned.

(51) Int. Cl.
G09G 5/00 (2006.01)
H05K 7/14 (2006.01)
G09G 5/12 (2006.01)

(52) U.S. Cl. .............. 345/173; 345/156; 345/168; 345/169; 345/179; 361/681; 361/683

(58) Field of Classification Search .............. 345/156, 345/168, 169, 170, 179, 184; 361/679, 680, 361/681, 682, 683
See application file for complete search history.

(56) References Cited

U.S. PATENT DOCUMENTS

| | | | |
|---|---|---|---|
| 5,247,285 A * | 9/1993 | Yokota et al. ............... 345/169 |
| 5,416,730 A | 5/1995 | Lookofsky | |
| D373,347 S * | 9/1996 | Ashley et al. ............. D14/106 |
| 5,561,446 A | 10/1996 | Montlick | |
| 5,644,338 A | 7/1997 | Bowen | |
| 5,644,469 A | 7/1997 | Shioya et al. | |
| 5,726,684 A | 3/1998 | Blankenship et al. | |
| 5,729,220 A | 3/1998 | Russell | |
| 5,801,793 A | 9/1998 | Faris et al. | |
| 5,808,862 A * | 9/1998 | Robbins ...................... 361/681 |
| 5,831,664 A | 11/1998 | Wharton et al. | |

(Continued)

FOREIGN PATENT DOCUMENTS

EP   0446414 A2 *   9/1991

*Primary Examiner*—Richard Hjerpe
*Assistant Examiner*—My-Chau T. Tran
(74) *Attorney, Agent, or Firm*—Whitham Curtis Christofferson & Cook, PC (57) ABSTRACT

An electronic sketch pad and auxiliary monitor to be used as a peripheral to personal computers. The electronic sketch pad and auxiliary monitor slides under or attaches to the computer keyboard and is used as an auxiliary monitor to the primary CRT monitor. The electronic sketch pad is above and parallel to the key tops, and can be adjusted to give enough room so you can still operate the keyboard. If you are video teleconferencing with a client or colleague you can sketch an idea on the electronic sketch pad and send it without interrupting your primary monitor screen. The operator can move the electronic sketch pad from an optimal sketch position to an optimal auxiliary monitor position below the primary monitor. Now while having a WEB screen on the primary monitor you can be taking notes, doing word processing or working other programs on the auxiliary monitor. With multi-monitor software the sketch pad and auxiliary monitor are in front of the operator relieving the need to twist the operators neck to the side, and saving desk space that would have been needed for a conventional CRT auxiliary monitor and digitizer.

20 Claims, 9 Drawing Sheets

U.S. PATENT DOCUMENTS

| | | | |
|---|---|---|---|
| 5,900,848 A | * | 5/1999 | Haneda et al. ................. 345/1 |
| 5,995,085 A | * | 11/1999 | Bowen ....................... 345/173 |
| 6,144,358 A | * | 11/2000 | Narayanaswamy et al. . 345/102 |

* cited by examiner

ELECTRONIC SKETCH PAD AND AUXILIARY MONITOR

CROSS-REFERENCE TO RELATED APPLICATIONS

This application is a continuation-in-part (CIP) application of U.S. Ser. No. 09/427,752, filed Oct. 27, 1999 now abandoned, and the complete contents of that application is herein incorporated by reference.

BACKGROUND OF THE INVENTION

1. Field of the Invention

The present invention generally relates to internet and personal computer peripheral type products, and, more particularly for computers using multi-screen software. Specifically, the invention is for making free hand sketches and then transmitting and receiving the sketches. The invention is placed above the standard computer keyboard with the integral auxiliary or second monitor below the primary monitor to save desk space and relieve neck stress from looking to the side where a more conventional second monitor would have been placed.

2. Description of the Prior Art

Keyboards have been manufactured for sometime with areas for mouse like functions where a computer operator places their finger in the area and by moving their finger around the cursor on the computer monitor moves to a desired position for data input.

Touch sensitive transparent overlays have been used over CRT monitors in a verity of applications from automatic teller machines to machine control operator stations.

One manufacturer of computer equipment has had software and hardware to implement multi-monitor use for a few years. They had limited market penetration because their platform would only run their software. Other software manufacturers have specific software for having a second monitor, but just for text type information. Now a second major software manufacturer will introduce multi-monitor software to be used on the majority of computers in the world. The major intent of this software is to be used with a second, third, etc., conventional CRT monitors. These monitors are bulky and will be placed to the side of the primary monitor.

There are also flat screen monitors, i.e. liquid crystal displays (LCD), electro-luminance (EL) and gas discharge. These monitors are packaged to be used as a primary monitor or display in industrial and commercial markets. They are either mounted to another structure, i.e., machine control operator station, or free standing, and not used as an auxiliary monitor or display.

Devices disclosed in U.S. Pat. Nos. 5,502,460 and 5,644,338 Bowen, which are herein incorporated by reference, disclose a display and overlay between separating keyboard sides that are integral to the keyboard, but would require the present customer base to replace their keyboard to have these features. Also, the keyboard must be opened to use the display and overlay and are much wider when opened than a standard keyboard, thus taking up premium desk space.

Digitizers have been used with a variety of sensing technologies, which can include resistive, capacitive and acoustic. They are used with CAD software and are large and take up more desk space than the computer keyboard. Some can be used for inputting sketches. One manufacturer has a computer with a digitizer over a LCD that will input a person's hand written signature.

Another manufacture has a camera mounted on a stand with a base and connected to a computer so an operator can place a picture on the base and take an electronic photo.

To date, the prior art has not addressed the present customer base with standard keyboards; having an auxiliary monitor in front of the operator relieving stress from looking to the side to see a conventional second monitor; being able to sketch in front of an operator while using a standard keyboard; and, saving premium desk space used by the second monitor and digitizer.

SUMMARY OF THE INVENTION

It is therefore an object of this invention to be an after market product to be used with present keyboards, and combine internet sketching, keeping the neck straight, having a second monitor or auxiliary display in front of the operator, and without sacrificing desk space in one product.

A further object of this invention is to have an electronic sketch pad so an operator, while conversing with a client or colleague, can sketch an idea and send it through the world wide web network instead of having to explain it verbally, leading to "a picture is worth a thousand words".

A further object of this invention is to be able to receive a sketch from a client or colleague on an auxiliary display while not disturbing the main display.

A further object of this invention is to provide a document holder in front of the operator.

A further object of this invention is to have a transparent sketch area over a standard keyboard so when using the electronic sketch pad the operator can see the keys on the keyboard through the sketch area.

A further object of this invention is to have an electronic sketch pad on a top surface of a pivoted platform to be used when the platform is in a down position and when the platform is in an up position the integral auxiliary display can be used.

A further object of this invention is to have an electronic sketch pad over a display so the object that is being sketched is shown while being sketched.

A further object of this invention is when the moveable platform is in the up position it does not impair vision or operation of the keyboard or primary display.

A further object of this invention is to provide control soft keys on the display.

A further object of this invention is to provide control buttons about the periphery of the display.

According to the invention, an electronic sketch pad or an auxiliary display or a combination of the two is used as a peripheral device to a computer system in combination with the keyboard, CPU, and main display of the computer system. The electronic sketch pad and/or auxiliary display are positioned in front of, underneath, and preferably over top of the keyboard, so that the user can view the computer's main display, as well as the auxiliary display and/or sketch pad simultaneously without having to crane his or her neck. Positioning the peripherals on a stand above the keyboard allows the auxiliary display and/or electronic sketch pad to be operated efficiently in essentially the same zone as the keyboard. In one embodiment, the electronic sketch pad will be substantially transparent such that the operator can see the keyboard's keys through the sketch pad.

BRIEF DESCRIPTION OF THE DRAWINGS

The foregoing and other objects, aspects and advantages will be better understood from the following detailed description of a preferred embodiment of the invention with references to the drawings, in which.

DETAILED DESCRIPTION OF THE PREFERRED EMBODIMENTS OF THE INVENTION

Figure 1:
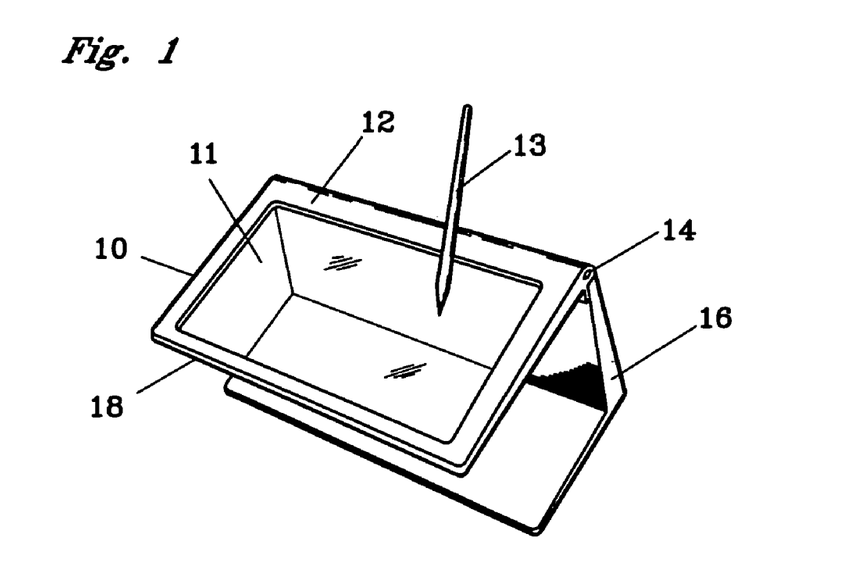
FIG. 1 shows the transparent electronic sketch pad on the platform in the down position in accordance with the teachings of this invention.

Referring now to the drawings, in which the same reference numeral indicates the same element in the various figures, FIG. 1 shows the electronic sketch pad 10 with transparent touch sensitive overlay 11 forming a digitizer that can be any technology by which tracking movement of stylus 13 can be tracked. Overlay 11 is shown being supported by upper side 12 of platform 18. Stylus 13 could be a pencil or other interface medium depending on the technology used in the overlay. Pivot 14 allows platform 18 to pivot from a down position where the top surface is substantially parallel to a plane formed by the top of the keyboard keys to an up position where the platform is substantially parallel to the face of the primary monitor, or at least to a position to the rear of the keyboard keys. Stand 16 supports platform 18 through pivot 14. When electronic sketch pad 10 is placed around a keyboard (not shown), with the keyboard resting on or positioned over the base of stand 16, the keys are visible through transparent touch sensitive overlay 11. The electronic sketch pad 10 functions as a peripheral input to the computer for inputting drawings, text, data, etc.

In operation, a standard keyboard and monitor are plugged into a host computer. The lower part of stand 16 is then placed beneath the keyboard placing overlay 11 above the keys. If the operator is in contact with a client or colleague and either person has an idea, the idea can be traced on the sketch pad and transmitted between the two or more persons. A piece of paper can be placed over the overlay to show the tract of a pencil drawing the image of the idea.

Figure 2:
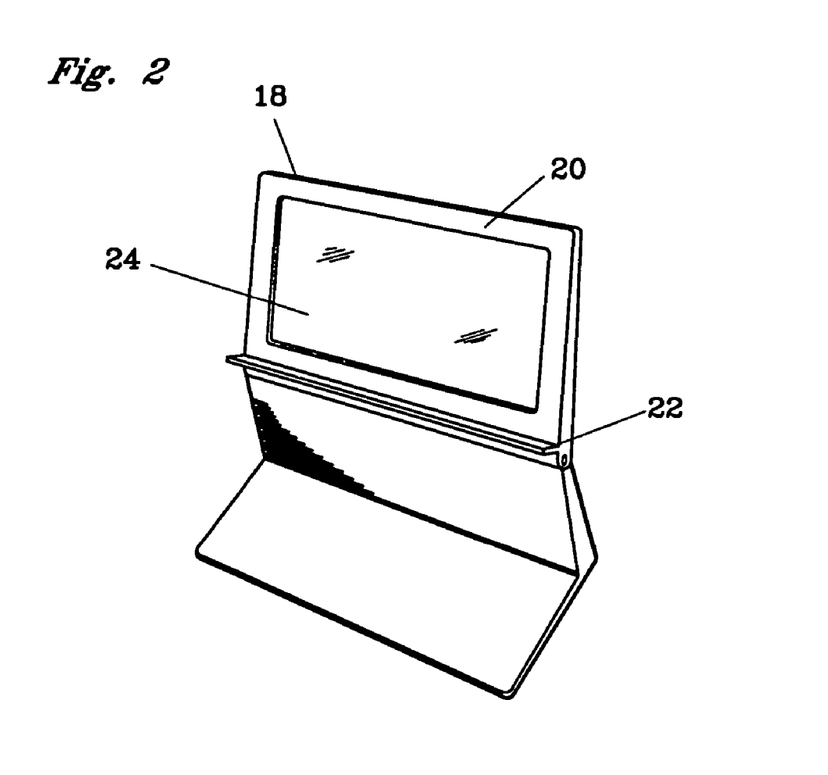
FIG. 2 shows the lower side of the transparent electronic sketch pad and document holder with the platform in the up position in accordance with the teachings of this invention.

FIG. 2 shows the lower side 20 of platform 18 and lower side 24 of transparent touch sensitive overlay 11 of FIG. 1. Document holder 22 holds notes or other reference material being used by the operator.

Figure 3:
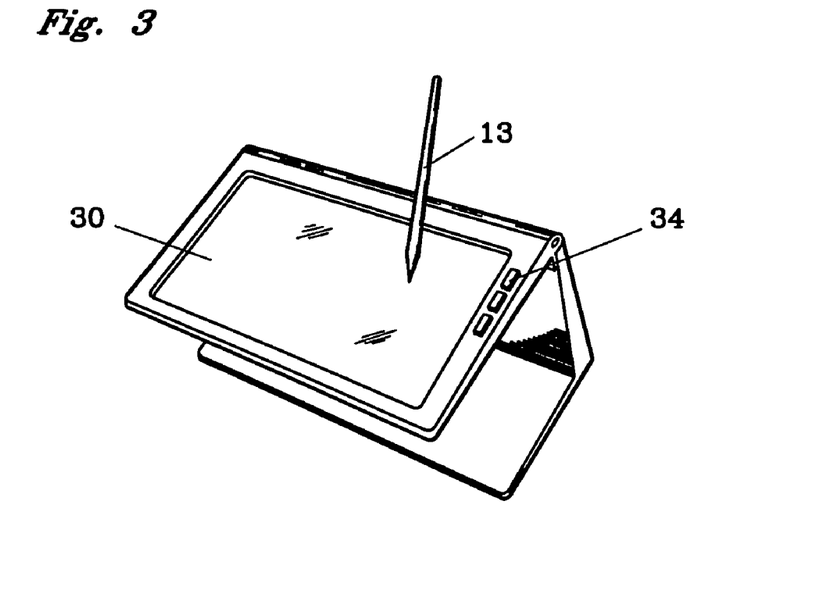
FIG. 3 shows the electronic sketch pad with control buttons on the platform in the down position in accordance with the teachings of this invention.

FIG. 3 shows touch sensitive overlay 30. Control keys 34 are shown in an area near one edge, it should be appreciated that those skilled in the art could desire to put these keys, or any number of keys, on other areas of the electronic sketch pad. These control keys could be used to send, clear, receive or other functions pertaining to the sketch or to other computer functions. Touch sensitive overlay 30 can also be used for mouse like functions like cursor control and selection on the primary computer monitor.

Figure 4:
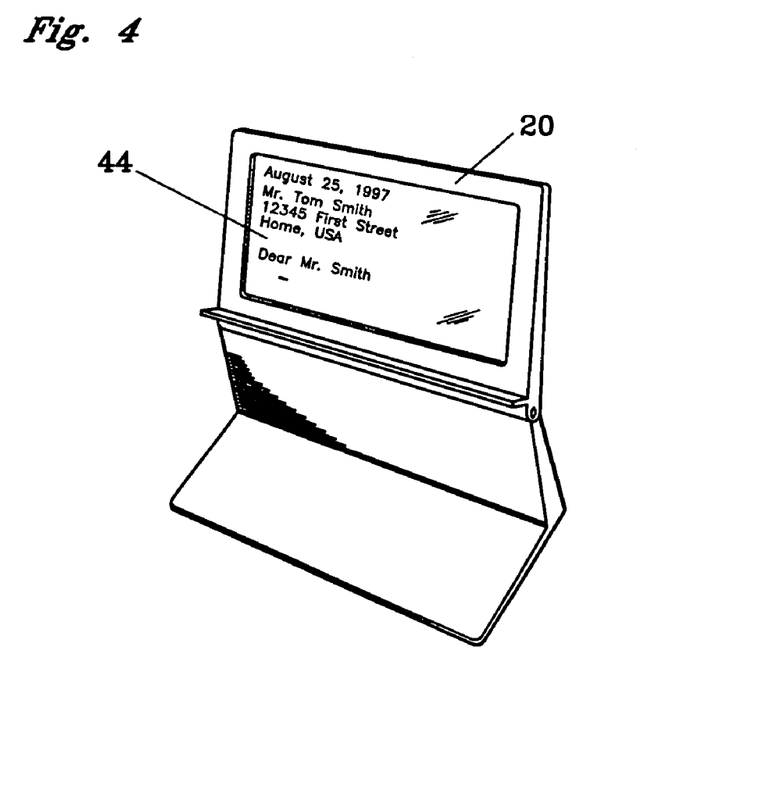
FIG. 4 shows an auxiliary display and document holder with the platform in the up position in accordance with the teachings of this invention.

FIG. 4 shows display 44 on lower side 20 when used in this configuration of auxiliary display. In operation this auxiliary display could be used for any operation in which the operator does not want to disturb the primary monitor. Example, if the primary monitor is showing a WEB screen the auxiliary display could be showing a program screen used for taking notes, word processing, or other programs. Although touch sensitive overlay 11 of FIG. 1 is to be transparent, because of display 44 in FIG. 4 touch sensitive overlay 30 of FIG. 3 need not be of a transparent technology. It should also be understood that the display 44, shown in FIG. 4, can also be used in the position of overlay 11 shown in FIG. 1. In either case, the display 44 forms part of a peripheral which is used in combination with the computer's main display (not shown) thereby allowing the user to look at both the main display and the auxiliary display simultaneously and/or separately but without any significant movement of the user's head or line of vision since the auxiliary display will either be positioned over the keyboard or above the keyboard and under the computer's main display.

Figure 5:
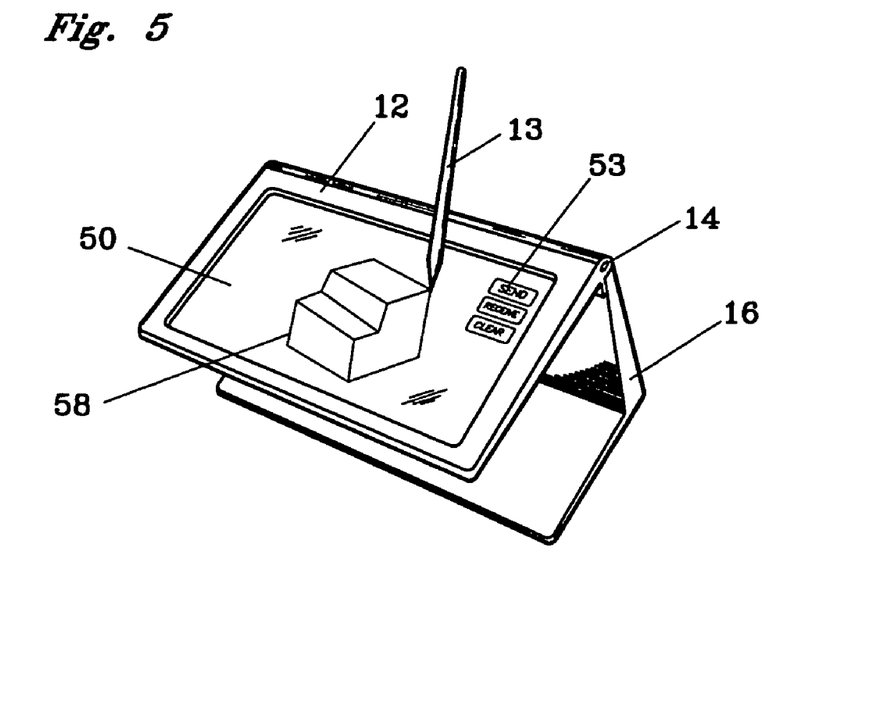
FIG. 5 shows the electronic sketch pad with the sketch area and soft keys being shown on the display in accordance with the teachings of this invention.

FIG. 5 shows display and touch sensitive overlay 50 with soft keys 53 and free hand sketch 58. Using display and touch sensitive overlay 50 to show the track of the movement of stylus 13 thus tracing the movement so the operator can see the image as it is drawn in real time. Soft keys 53 can be used for sketch control, or when used with the touch sensitive area for mouse like functions of cursor control and selection they can be used to control the primary monitor and the auxiliary display below the touch sensitive area. A second display can also be on the lower side of platform 12 like shown in FIG. 4.

Figure 6:
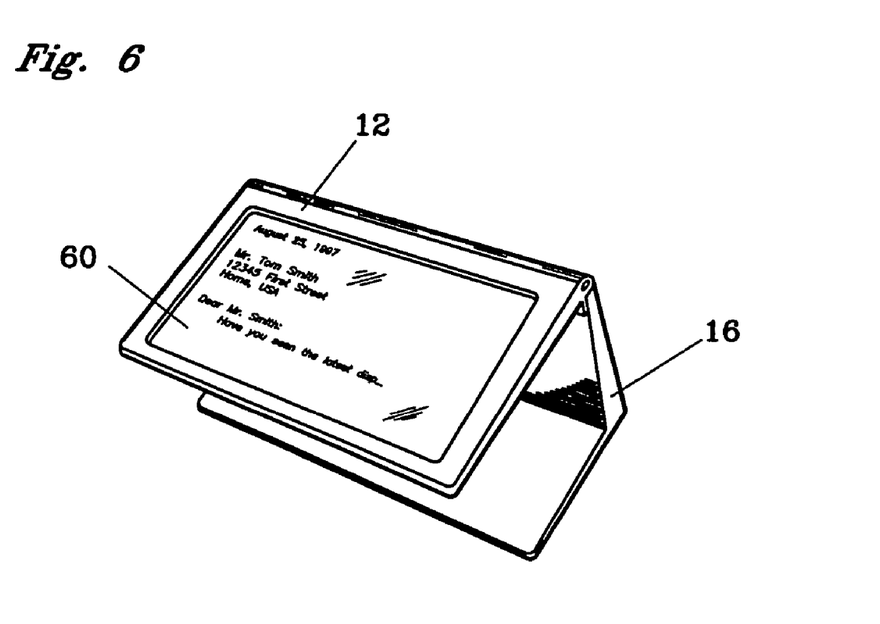
FIG. 6 shows an auxiliary display on the top surface of the platform in the down position in accordance with the teachings of this invention.

FIG. 6 shows display 60 being used as an auxiliary display peripheral for word processing or other software programs, for example, when the operator does not want the computer's primary display screen disturbed. If the operator would desire, the auxiliary display could function as the primary display. Example, if the operator was tele-video conferencing, they could have a screen showing the called person image on the primary display and have a screen doing the normal operation of program control from the auxiliary display 60.

Figure 7:
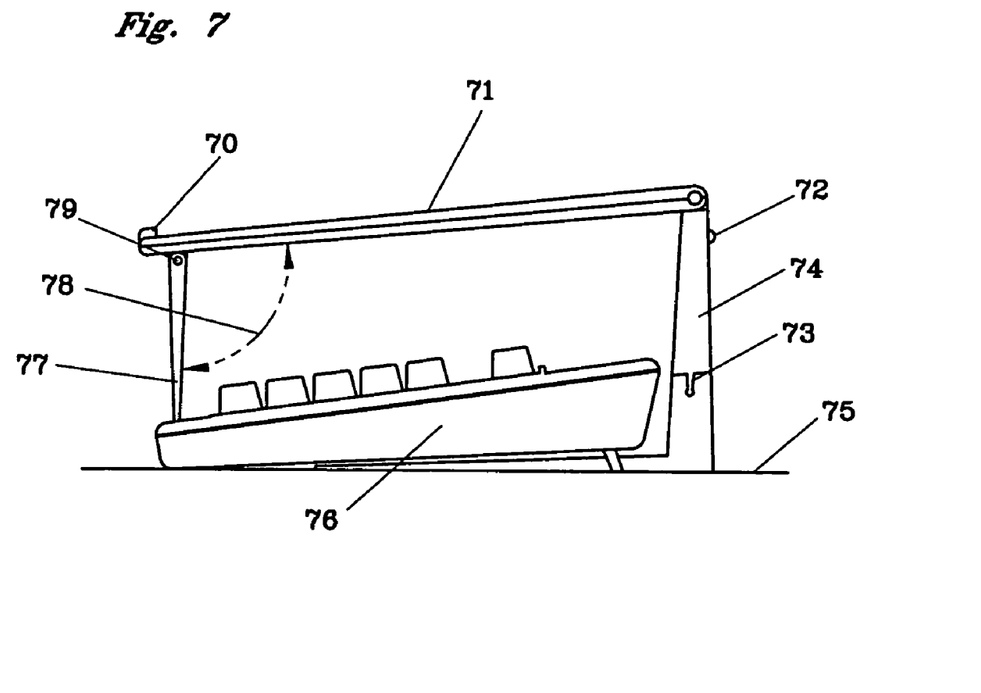
FIG. 7 shows a side view of the platform and stand around a standard keyboard with a pivoting support foot in accordance with the teachings of this invention.

FIG. 7 shows platform 71 with document holder 70 being supported by platform support 77, shown in the support position, that moves through arc 78 from pivot 79 to an up position that is near to the lower side of platform 71. Standard keyboard 76, resting on desk surface 75, is shown with stand 74 underneath also resting on desk surface 75. LED 72 is for wireless communication with the host computer. Detachable snap 73 allows unplugging the upper portion of stand 74 and plugging it into snap slot 85 of FIG. 8. This snap connection between snap 73 and snap slot 85 can also house the electrical connection so there are no wires to unplug or plug. If power only is coming from the snap connection, then LED 72 can transmit data responsive from the touch sensitive overlay.

Figure 8:
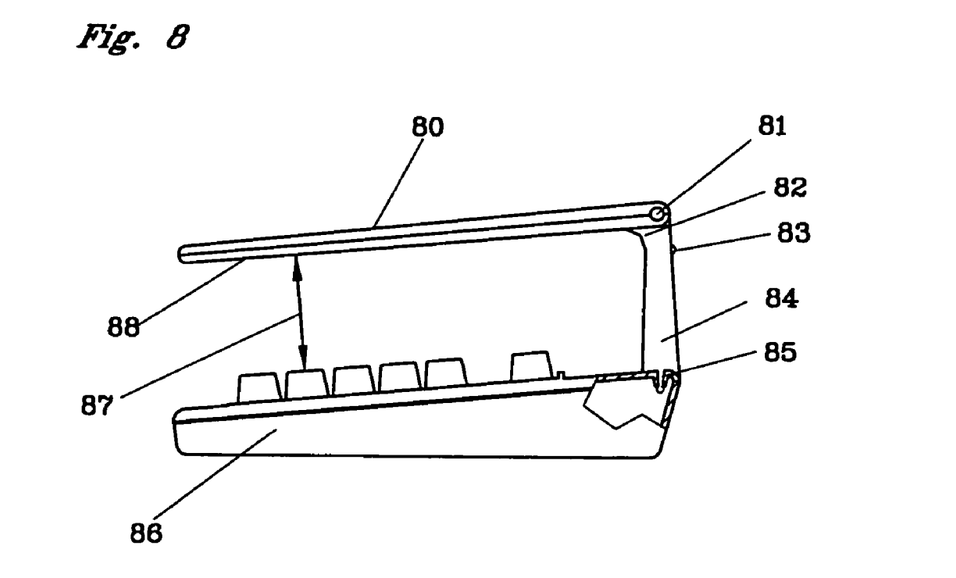
FIG. 8 shows a side view of the platform and snap in stand with finger clearance between the platform and keyboard keys in accordance with the teachings of this invention.

FIG. 8 shows platform 80 pivots from pivot 81, being supported from support 82 and is integral to removable stand 84. Removable stand 84 plugs into snap slot 85 of keyboard 86. LED 83 is for wireless communication with the host computer. Clearance 87 is for the operator's fingers when typing with platform 80 shown in the down position.

Figure 9:
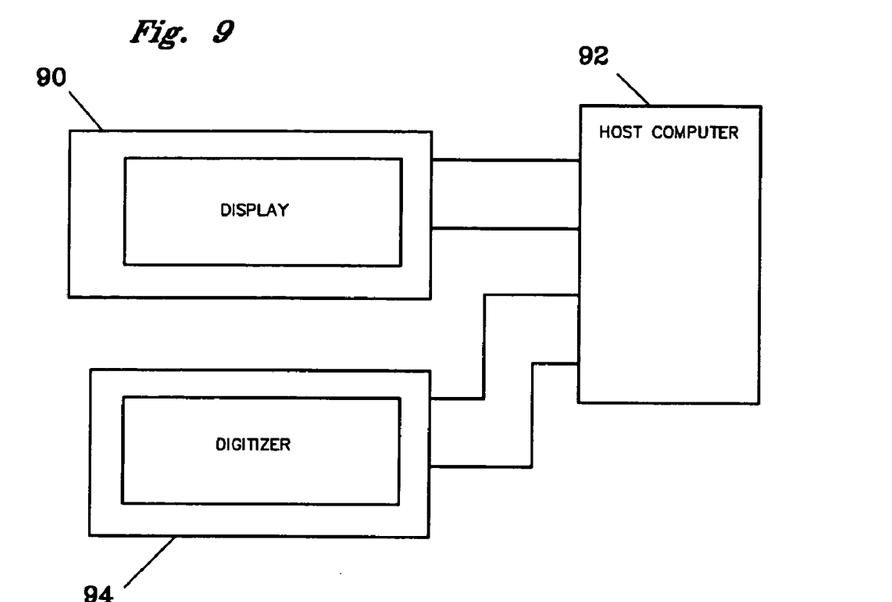
FIG. 9 shows an system block diagram when the display and digitizer have individual self contained electronics that can be connected directly to standard ports on the host computer in accordance with the teachings of this invention.

FIG. 9 shows a system block diagram whereby display 90 and digitizer 94 have individual self contained electronics that can be connected directly to standard ports on host computer 92. These standard ports could be, but not limited to, a serial or parallel port, or a port on a computer bus receivable printed circuit board with connections exposed to the outside of the computer.

Figure 10:
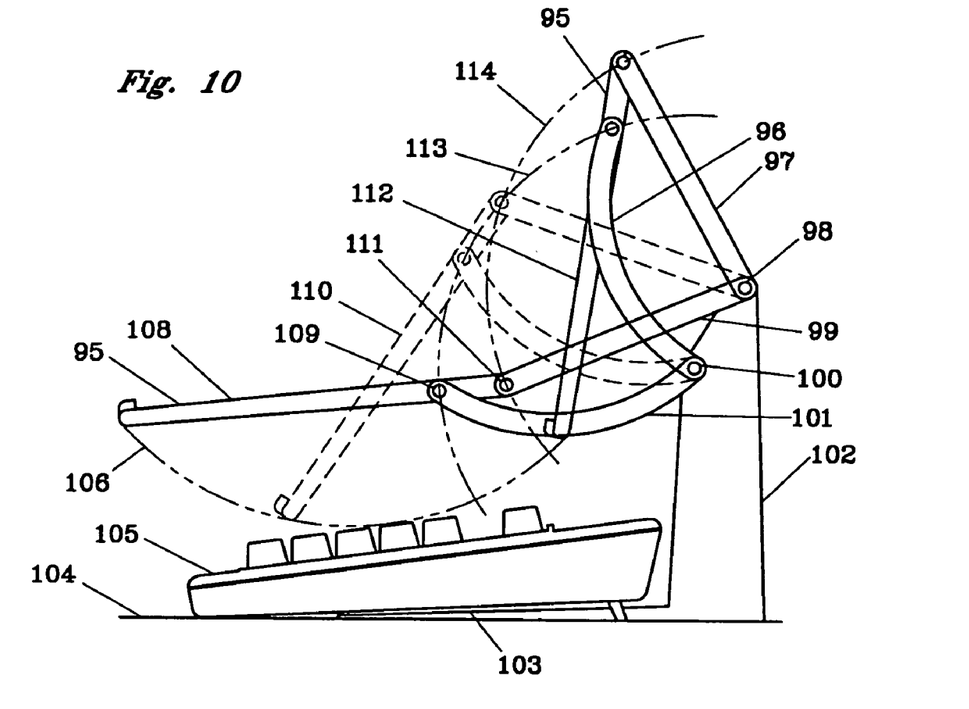
FIG. 10 shows a side view of a linkage system to position the digitizer in a optimal sketch or writing position and then moved the display to an optimal displaying position in accordance with the teachings of this invention.

FIG. 10 shows a side view of a linkage system to move a platform 95, shown in an optimal hand writing or sketching position 108, through arc 106, through an intermediate position 110, and then to an optimal display position 112 to the rear of keyboard 105 keys. In this two bar four pivot linkage system, platform 95 is connected to base 102, having base stabilization support 103 under keyboard 105 and resting on support surface 104, through forward lower pivot 109 moving in arc 113 and forward upper pivot 111 moving in arc 114, lower bar 101 and upper bar 99 shown in the optimal hand writing position, and rear lower pivot 100 and rear upper pivot 98. Lower bar 101 is in position 96 and upper bar 99 is in position 97 when platform 95 is in the optimal display position 112. Platform 95 can have a digitizer or display, or can have both the digitizer and a display. Obviously those skilled in the art could change the system to achieve different arcs and angles of platform 95 to further define optimal positions. Platform 95 could be used in any intermediate positions depending on an operators preference. Pivots 109, 111, 98 and 100 can have positional detents and or pivotal friction to allow stabilization of platform 95 in different positions. This linkage system allows a digitizer and display to be on the same side of platform 95 and be positioned in an optimal position for both displaying data and inputting sketches.

Figure 11:
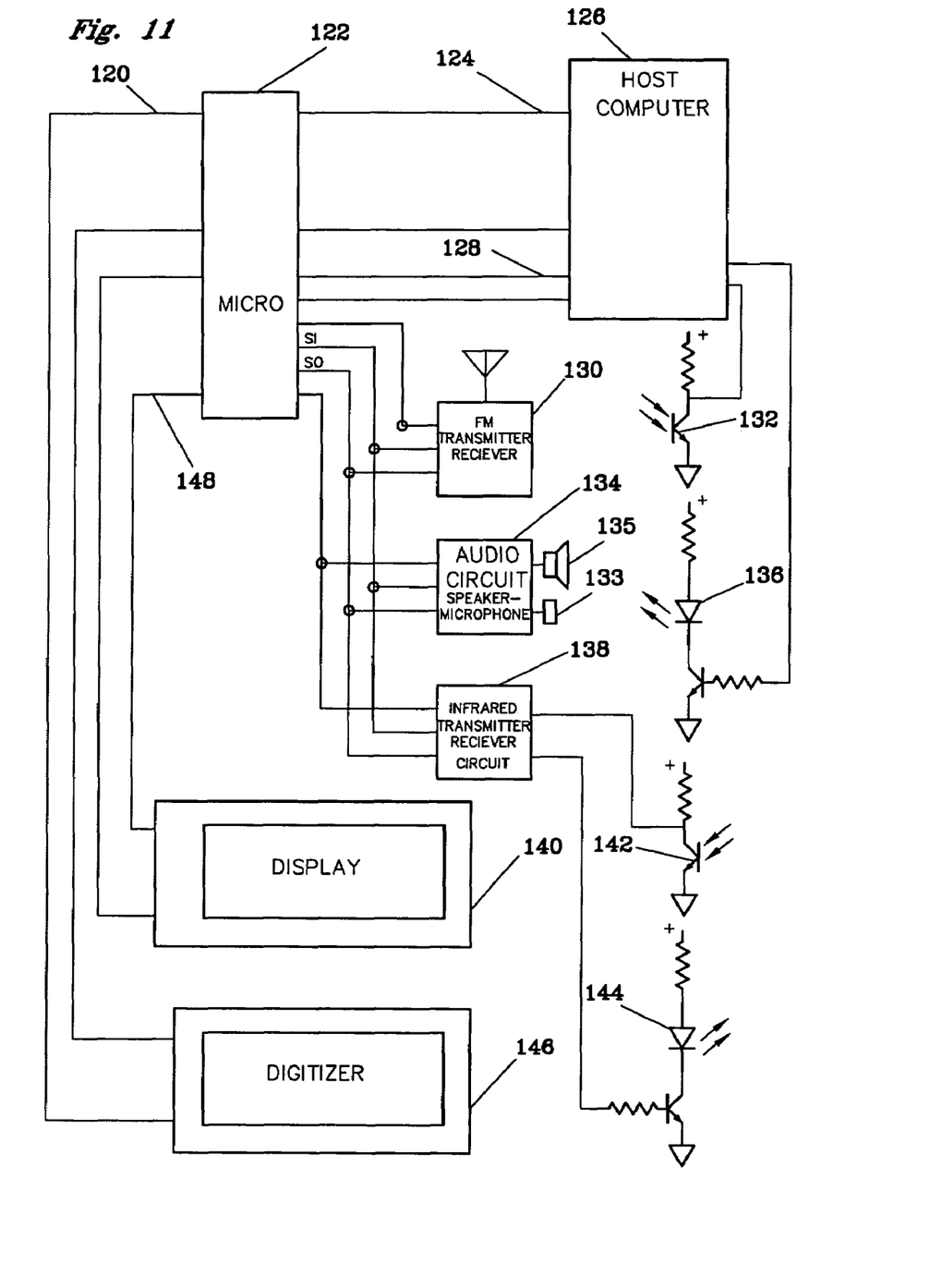
FIG. 11 shows a system block diagram when the display and digitizer have a microprocessor to condition the input and output signals to be received by the host computer in accordance with the teachings of this invention.

FIG. 11 shows a system block diagram where the display 140 and digitizer 146 are connected to microprocessor 122 through display port 148 and digitizer port 120. These ports could send and receive lower level X and Y locations, in the case of using just a touch sensitive overlay, or higher level programs. Host computer 126 could receive data through either parallel port 124 or serial data through connection 128. Connection 128 can either be a standard serial port or a connection to a port on a computer bus receivable printed circuit board with connections exposed to the outside of the computer. Optional FM transmitter receiver 130 can transfer data when a plug type connection for data is not optimal. Optional infrared transmitter receiver circuit 138 can transfer data when a plug type connection for data is not optimal through detector 142 and emitter 144 to detector 132 and emitter 136. The power for microprocessor 122, digitizer 146 and display 140 can be self contained, line supplied, or be supplied from the host computer 126. Audio circuit 134 through microphone 133 and speaker 135 can send and receive verbal sounds, information or instructions from or to a teleconference, or audible feedback of functions being preformed from or to the display and or digitizer. It should be appreciated that although one speaker and microphone are shown multiple speakers and microphones could be used.

Figure 12:
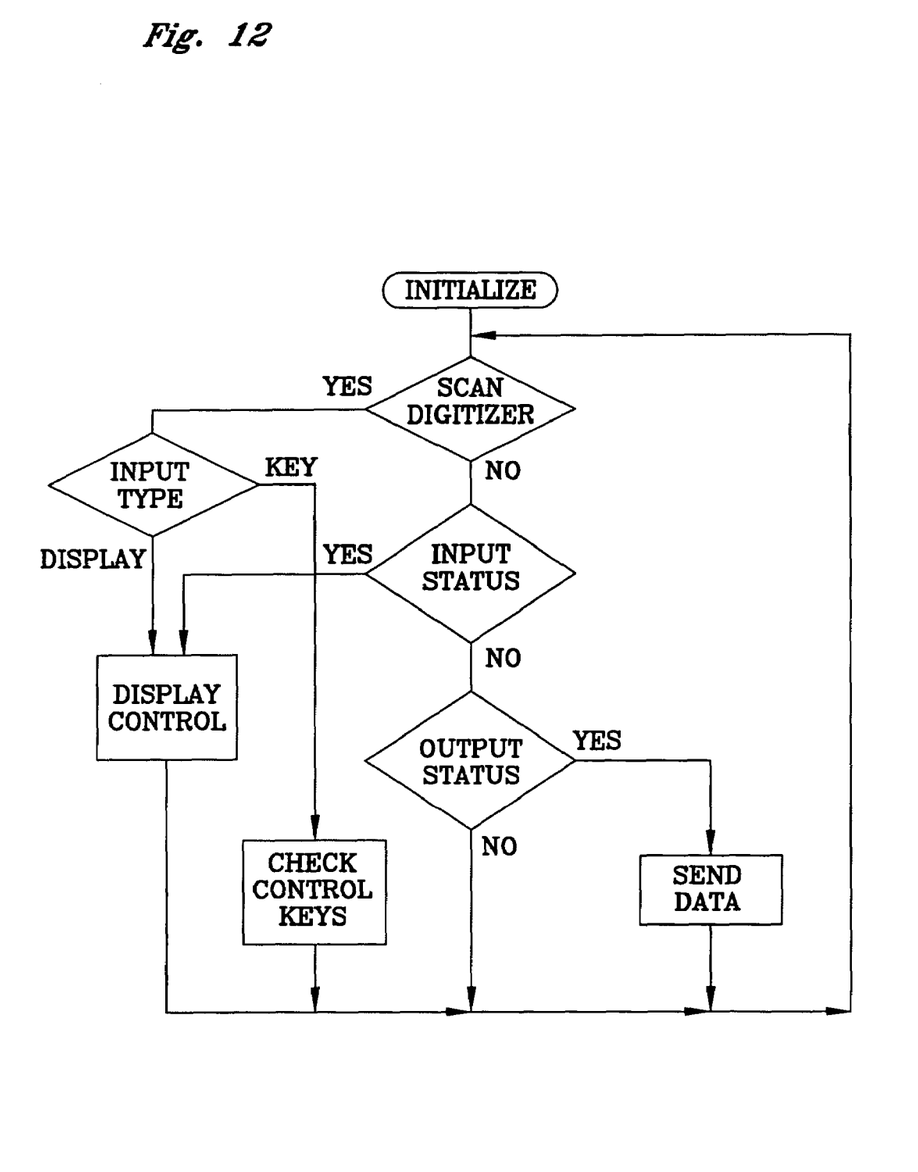
FIG. 12 shows a high level software flow chart of microprocessor operation in accordance with the teachings of this invention.

FIG. 12 shows a high level software flow chart of microprocessor operation. In the INITIALIZE step system parameters that have been previously stored are retrieved and set the control of the hardware and software. The parameters are, but no limited to, soft or hard keys being used, parallel, serial, radio frequency, and or infrared input/output, and speaker and or microphone enabled. At the SCAN DIGITIZER step the digitizer is scanned to see if an operator's finger or stylus is inputting data, if NO, meaning there is no data coming from the digitizer then INPUT STATUS is checked to see if data is being input from the host. This data can be, but not limited to, video coming to the display, audio coming from the host for speaker output, or text data coming from the host to be displayed. If the NO condition is met, meaning no data coming in, then step OUTPUT STATUS is checked to see if data is ready to go to the host, if the NO condition is met, then the loop returns to SCAN DIGITIZER. If the YES condition is met, then at SEND DATA the data is sent to the host via the communication parameter set in INITIALIZE. At SCAN DIGITIZER, if there is data being input from the digitizer, a YES condition is met and is interrogated by INPUT TYPE. If the data source is from a KEY, then at CHECK CONTROL KEYS, different parameters are tested for control and are, but not limited to, clear the display, flip display with primary monitor, send sketch, video to the display, current program to the display, receive sketch, or program mode, in which the parameters are set or changed for the INITIALIZE step through the keys or sequence of keys. After, or if changes are made, the loop returns back to SCAN DIGITIZER. If at INPUT TYPE the data is coming from a sketch then the DISPLAY condition is met and data is sent to DISPLAY CONTROL to be displayed. Likewise, if at INPUT STATUS the YES condition is met then that data is sent to DISPLAY CONTROL to be displayed. After the data has been sent to DISPLAY CONTROL the loop returns back to SCAN DIGITIZER.

Figure 13:
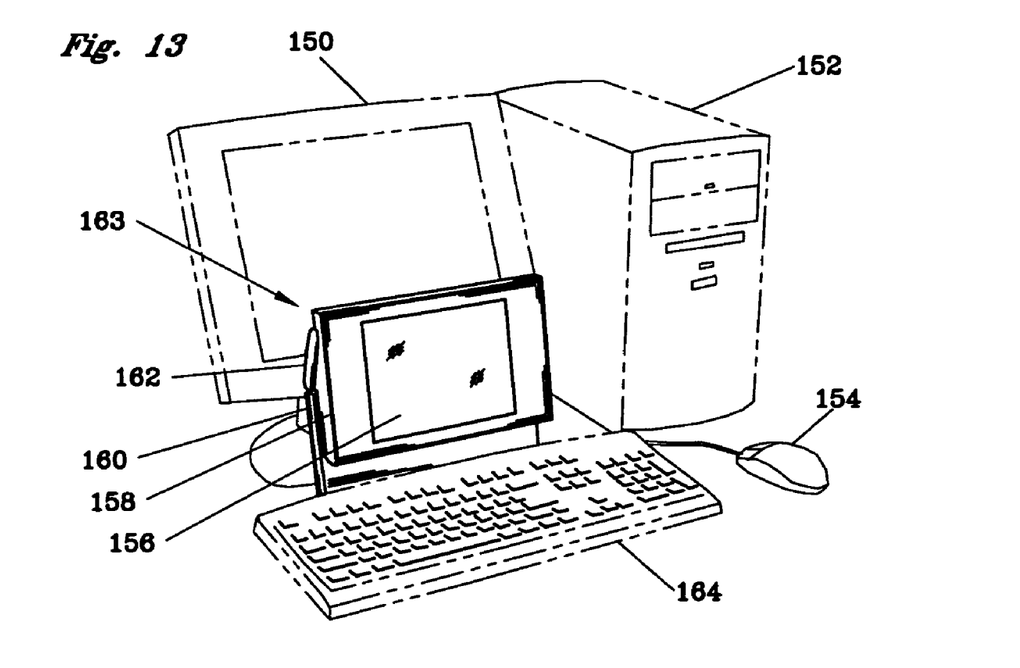
FIG. 13 shows a computer, main display, mouse, keyboard and auxiliary or peripheral display in an up or more vertical position in accordance with the teachings of this invention.
Figure 14:
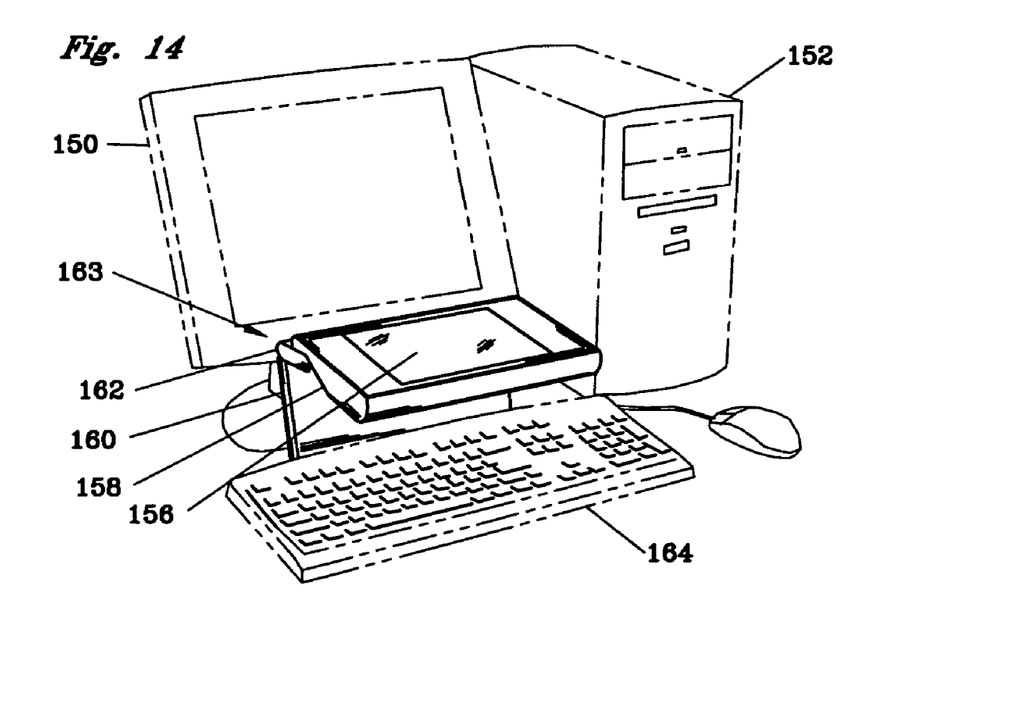
FIG. 14 shows a computer, main display, mouse, keyboard and auxiliary or peripheral display in a down or more horizontal position in accordance with the teachings of this invention.

FIG. 13 shows a standard personal computer (PC) for use on a desktop with the addition of auxiliary/peripheral display 163, in particular it shows in phantom a desktop main display 150, computer 152, a mouse 154, and a desktop keyboard 164, and auxiliary/peripheral display 163, being an auxiliary display to main display 150 and a peripheral display to computer 152. Although the main display is shown as a flat panel display it should be understood to those skilled in the art it can also be a CRT display or monitor. Auxiliary/peripheral display 163 can display the same information as main display 150, or display different information than main display 150. Platform 158 is pivotally received to link 162 which is pivotally received to base 160. This pivotal connection of link 162, platform 158 and base 160 allows the platform to pivot from a more vertical position in FIG. 13 to a more horizontal position over keyboard 164 as shown in FIG. 14. Base 160 can be of similar construction as base 102 and stabilization support 103 of FIG. 10 showing stabilization support 103 under keyboard 105, or like removable stand 84 that plugs into keyboard 86 of FIG. 8.

Display surface 156 can either be a display with a touch screen for inputting data to computer 152, or only a display for viewing the same information or different information than on main display 150, whereas both sources coming from the same computer.

As shown in situ auxiliary/peripheral display 163 advantageously is situated in front of the operator keeping their neck straight and the same line of vision as main display 150 and keyboard 164 thus reducing neck stress and improving efficiency, while still leaving the same amount of open room to either side of the keyboard on a desk surface as if auxiliary/peripheral display 163 was not there, thus saving valuable desk space for multitasking operators.

The use of auxiliary/peripheral display 163 in a computer system with a main display requires the use of two video ports coming from the computer. Although laptop and notebook computers have a standard second video port which is a mimic of the main display of the laptop or notebook computer, to advantageously use auxiliary/peripheral display 163 the second video port should be able to produce a second monitor function whereas the second port is sending different video images than the first video port that is driving the normal laptop or notebook computer display, therefor the most advantageous use of auxiliary/peripheral display 163 is being used in a deck top computer system.

As discussed previously in conjunction with FIGS. 1–8, it should be understood that the display 163 shown in FIGS. 13 and 14 might also function as an electronic sketch pad or a combination of a display and sketch pad.

Figure 15:
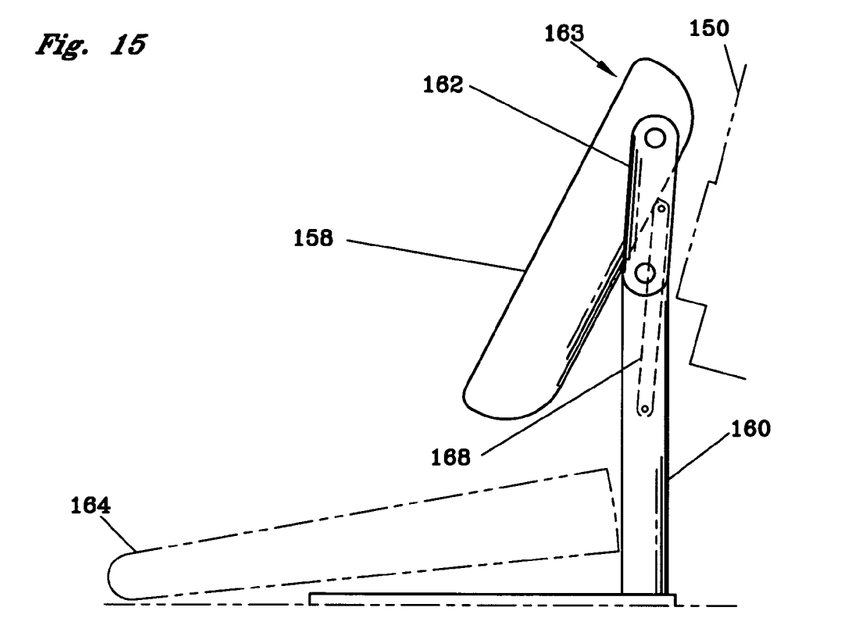
FIG. 15 shows a side view of FIG. 13 with the auxiliary or peripheral display in an up or more vertical position in accordance with the teachings of this invention.

FIG. 15 shows in phantom main display 150 and keyboard 164, and auxiliary/peripheral display 163. Lower link 168 makes up a four pivot two link pivot mechanism with associated link 162 to allow platform 158 to pivot from a more vertical position as in FIG. 15 to a more horizontal position as in FIG. 16 while at the same time affixing platform 158 in either the more vertical or more horizontal position when positioned therein. The placement of the link fulcrum points and the weight of platform 158 work to affix platform 158 in the more vertical and more horizontal positions without the use of other manual locking devises. Obviously it should be understood to those skilled in the art could add a manual locking means at any or all of the pivot points. A similar four pivot two link pivoting mechanism is more detailed in FIG. 10. Further by design for specific applications auxiliary/peripheral display 163 could be made not to pivot so being fixed in one optimal position.

Figure 16:
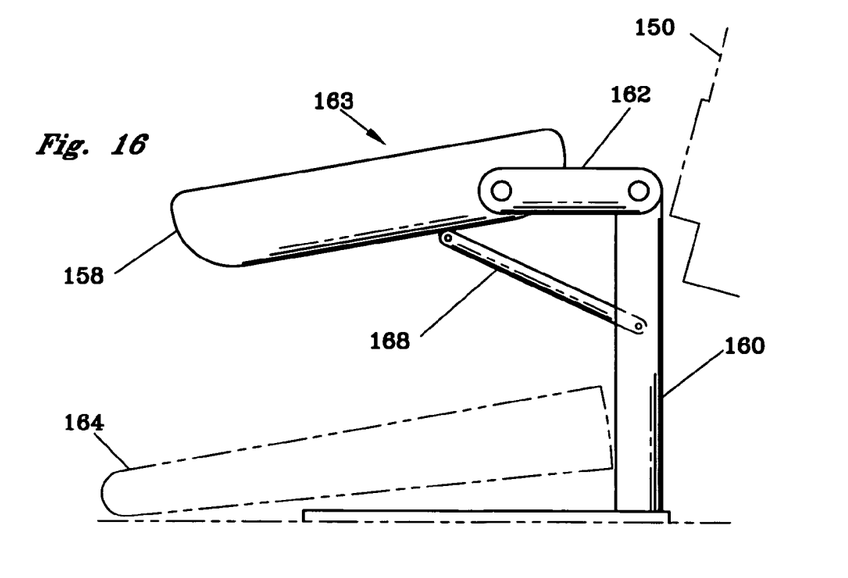
FIG. 16 shows a side view of FIG. 14 with the auxiliary or peripheral display in a down or more horizontal position in accordance with the teachings of this invention.

In FIG. 15 and FIG. 16, the base 160 is shown fitting under keyboard 164 to stabilize auxiliary/peripheral display 163 when finger pressure is applied to the display surface 156 of FIG. 13. It should also be appreciated that the thin part of base 160 fitting under keyboard 164 counter balances the moment of mass of platform 158, or as in FIG. 8 where keyboard 86 would counter balance the moment of mass of platform 158. FIG. 15 and FIG. 16 further shows by design the intended use of auxiliary/peripheral display 163 allows it to be advantageously situated between main display 150 and keyboard 164 of all personal computers with separate keyboards and displays, plus taking up virtually no desk space. And as in FIG. 8 when the vertical section of base 160 is plugged into keyboard 164 auxiliary/peripheral display 163 does not require any desk space.

Further to FIG. 15, because of base 160 being thin enough to fit under keyboard 164 and the moment of mass being forward over the thin part of base 160 allowing auxiliary/peripheral display 163 to advantageously be positioned near a wall or other object that a normal display could not be used thus making auxiliary/peripheral display 163 the main and only display of a computer system.

While the invention has been described in terms of its preferred embodiments, those skilled in the art will recognize that the invention can be practiced with modification within the spirit and scope of the appended claims.

The invention claimed is:

1. An auxiliary/peripheral display to be used with a PC computer with a standard separate desktop main display and a standard separate desktop keyboard, comprising in combination:
   said auxiliary/peripheral display having a display element for displaying information to a computer operator, said information can be the same or different information as being displayed on said main display,
   means for affixing said display element in a position a distance above keys of said keyboard which allows said computer operator to operate said keys,
   said means for affixing includes a vertical member affixed to said display element which elevates said display element above said keys affixed to a horizontal member placed under said keyboard, therefor positioning said vertical member to the rear and between said keyboard and said main display allowing said computer operators line of vision with said main display, said keyboard and said display element to be the same,
   said display element having a moment of mass above said keys whereas said mass is counter balanced by said horizontal member.

2. An auxiliary/peripheral display of claim 1 wherein said display element is positionable in a first position that is approximately horizontal and directly above, over, and substantially parallel to said keys.

3. An auxiliary/peripheral display of claim 1 wherein said display element is positionable in a second position that is approximately vertical and substantially perpendicular to said keys.

4. An auxiliary/peripheral display of claim 1 further comprising a linkage means to pivot said display element from said first position to said second position.

5. An auxiliary/peripheral display of claim 4 further comprising a means for holding said display element in said first position or said second position.

6. An auxiliary/peripheral display of claim 1 further comprising a touch sensitive member for inputting electronic information into said computer.

7. An auxiliary/peripheral display of claim 1 wherein said horizontal member is thin enough so as not to affect the attitude of said keyboard.

8. An auxiliary/peripheral display to be used with a PC computer with a separate desktop main display and separate desktop keyboard, comprising in combination:
   said auxiliary/peripheral display having a display element for displaying information to a computer operator, said information can be the same or different information as being displayed on said main display,
   means for affixing said display element in a first position a distance directly above and over keys of said keyboard which allows said computer operator to operate said keys, said means for affixing includes either a) a vertical element which elevates said display element above said keys and a horizontal member which fits under said keyboard therefor placing said vertical element to the rear and between said keyboard and said main display allowing said computer operators line of vision with said main display, said keyboard and said display element to be the same, said display element having a moment of mass above said keys whereas said mass is counter balanced by said horizontal member, or b) a vertical member which elevates said display element above said keys and is connected at a base of said vertical member which is selectively connectable to and disconnectable from said keyboard, wherein said vertical element is connected to the rear of said keyboard in front of said main display allowing said computer operators line of vision with said main display, said keyboard and said display element to be the same, said display element having a moment of mass above said keys whereas said mass is counter balanced by said keyboard.

9. An auxiliary/peripheral display of claim 8 wherein said means for affixing is (a).

10. An auxiliary/peripheral display of claim 8 wherein said means for affixing is (b).

11. An auxiliary/peripheral display of claim 8 wherein said first position is approximately horizontal and directly above and substantially parallel to said keys.

12. An auxiliary/peripheral display of claim 8 wherein said display element is positionable in a second position that is more vertical than said first position and substantially perpendicular to said keys.

13. An auxiliary/peripheral display of claim 8 further comprising a linkage means to pivot said display element from said first position to said second position.

14. An auxiliary/peripheral display of claim 13 further comprising a means for holding said display element in said first position or said second position.

15. An auxiliary/peripheral display of claim 8 further comprising a touch sensitive member for inputting electronic information into said computer.

16. An auxiliary/peripheral display of claim 8 wherein said horizontal member is thin enough so as not to affect the attitude of said keyboard.

17. A personal computer system, comprising:

a computer;

a keyboard connected to said computer;

an auxiliary/peripheral display connected to said computer having a display element for displaying information to a computer operator above said keyboard; and means for affixing said display element in a position a distance above keys of said keyboard which allows said computer operator to operate said keys, said means for affixing includes a vertical member affixed to said display element which elevates said display element above said keys affixed to a horizontal member placed under said keyboard, said display element having a moment of mass above said keys whereas said mass is counter balanced by said horizontal member.

18. An auxiliary/peripheral display of claim 17 further comprising a touch sensitive member for inputting electronic information into said computer.

19. An auxiliary/peripheral display of claim 17 wherein said horizontal member is thin enough so as not to affect the attitude of said keyboard.

20. An auxiliary/peripheral display of claim 17 further comprising a main display connected to said computer.

* * * * *